US009168479B2

(12) United States Patent
Aoki

(10) Patent No.: US 9,168,479 B2
(45) Date of Patent: Oct. 27, 2015

(54) PLUGGED HONEYCOMB STRUCTURE

(71) Applicant: NGK INSULATORS, LTD., Nagoya (JP)

(72) Inventor: Takashi Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 115 days.

(21) Appl. No.: 13/960,000

(22) Filed: Aug. 6, 2013

(65) Prior Publication Data
US 2014/0041349 A1 Feb. 13, 2014

(30) Foreign Application Priority Data

Aug. 13, 2012 (JP) .................................. 2012-179408

(51) Int. Cl.
| | |
|---|---|
| *B01D 39/06* | (2006.01) |
| *B01D 39/20* | (2006.01) |
| *B01D 24/00* | (2006.01) |
| *B01D 46/24* | (2006.01) |
| *F01N 3/022* | (2006.01) |

(52) U.S. Cl.
CPC .......... *B01D 46/2459* (2013.01); *B01D 46/247* (2013.01); *B01D 2046/2496* (2013.01); *F01N 3/0222* (2013.01); *F01N 2330/48* (2013.01); *F01N 2450/28* (2013.01)

(58) Field of Classification Search
CPC ........... B01D 46/2459; B01D 46/2451; B01D 46/244
See application file for complete search history.

(56) References Cited

U.S. PATENT DOCUMENTS

| | | | | |
|---|---|---|---|---|
| 5,629,067 | A | * 5/1997 | Kotani et al. | ................. 428/116 |
| 7,575,793 | B2 | * 8/2009 | Aniolek et al. | ............... 428/116 |
| 7,806,956 | B2 | * 10/2010 | Anderson et al. | ............... 55/523 |
| 8,128,723 | B2 | * 3/2012 | Mizutani | ......................... 55/523 |
| 8,257,460 | B2 | * 9/2012 | Komori et al. | ................. 55/523 |
| 8,444,752 | B2 | * 5/2013 | Beall et al. | ....................... 95/273 |
| 8,852,311 | B2 | * 10/2014 | Komori et al. | ................. 55/523 |
| 2003/0093982 | A1 | * 5/2003 | Suwabe et al. | ................. 55/523 |

(Continued)

FOREIGN PATENT DOCUMENTS

| | | |
|---|---|---|
| EP | 1 384 507 A2 | 1/2004 |
| EP | 1 452 702 A2 | 9/2004 |

(Continued)

OTHER PUBLICATIONS

Extended European Search Report (Application No. 13179388.7) dated Jan. 3, 2014.

*Primary Examiner* — Amber Orlando
(74) *Attorney, Agent, or Firm* — Burr & Brown, PLLC

(57) ABSTRACT

A plugged honeycomb structure includes a honeycomb structure section having porous partition walls, the plurality of cells including large cells and small cells having different open areas in a cross section perpendicular to an extending direction of the cells; inflow side plugged portions arranged in inflow side end portions of the predetermined cells including the large cells and the small cells among the plurality of cells; and outflow side plugged portions arranged in outflow side end portions of the remaining cells including the large cells and the small cells among the plurality of cells. The predetermined cells are outflow cells having the plugged inflow side end portions and the open outflow side end portions in the honeycomb structure section, and the remaining cells are inflow cells having the plugged outflow side end portions and the open inflow side end portions in the honeycomb structure section.

8 Claims, 7 Drawing Sheets

(56) References Cited

U.S. PATENT DOCUMENTS

| | | | |
|---|---|---|---|
| 2004/0071932 A1* | 4/2004 | Ishihara et al. | 428/116 |
| 2004/0101654 A1* | 5/2004 | Hijikata | 428/116 |
| 2004/0161373 A1* | 8/2004 | Ichikawa et al. | 422/180 |
| 2004/0170803 A1* | 9/2004 | Ichikawa | 428/116 |
| 2004/0258582 A1* | 12/2004 | Miwa et al. | 422/177 |
| 2005/0011174 A1 | 1/2005 | Hong et al. | |
| 2005/0016140 A1 | 1/2005 | Komori et al. | |
| 2005/0016141 A1 | 1/2005 | Hong et al. | |
| 2005/0210848 A1* | 9/2005 | Kuki et al. | 55/523 |
| 2007/0227109 A1 | 10/2007 | Hong et al. | |
| 2008/0086993 A1 | 4/2008 | Komori et al. | |
| 2008/0110341 A1* | 5/2008 | Ketcham et al. | 95/274 |
| 2008/0124517 A1* | 5/2008 | Beall et al. | 428/118 |
| 2008/0311340 A1* | 12/2008 | Kasai et al. | 428/116 |
| 2009/0252919 A1* | 10/2009 | Ogura | 428/116 |
| 2010/0255250 A1 | 10/2010 | Komori et al. | |
| 2014/0248464 A1* | 9/2014 | Soga | 428/117 |

FOREIGN PATENT DOCUMENTS

| | | |
|---|---|---|
| WO | 2004/024294 A1 | 3/2004 |
| WO | 2010/149908 A1 | 12/2010 |

\* cited by examiner ial matter (PM) in large amounts. Moreover, small cells each having an open area smaller than the large cells are formed, and hence there is not generated any clogging due to deposition of the ash and the particulate matter (PM) in outflow side end portions, to suppress an increase of a pressure loss.

PLUGGED HONEYCOMB STRUCTURE

The present application is an application based on JP-2012-179408 filed on Aug. 13, 2012 with the Japanese Patent Office, the entire contents of which are incorporated herein by reference.

BACKGROUND OF THE INVENTION

1. Field of the Invention

The present invention relates to a plugged honeycomb structure, and more particularly, it relates to a plugged honeycomb structure which can collect ash and particulate matter (PM) in large amounts and in which an increase of a pressure loss is suppressed.

2. Description of Related Art

In gases discharged from an internal combustion engine such as a diesel engine, various burning devices, and the like, a large amount of particulate matter (PM) mainly composed of soot is included. When this PM is discharged to the atmosphere as it is, an environmental pollution is caused. Therefore, in an exhaust system of the exhaust gas, a filter to collect the PM (e.g., a diesel particulate filter (DPF)) is disposed.

As the filter, there has been used a plugged honeycomb structure having porous partition walls with which a plurality of cells are formed to become through channels of fluids (an exhaust gas and a purified gas), and plugged portions to plug open frontal areas of the cells. The plugged portions are arranged in the open frontal areas of the predetermined cells (inflow cells) in an end surface on an outflow side of the fluid (the purified gas), and the open frontal areas of the remaining cells (outflow cells) in an end surface on an inflow side of the fluid (the exhaust gas).

In the above plugged honeycomb structure, when the exhaust gas is allowed to flow into the inflow cells, the PM in the exhaust gas is collected by the partition walls during passage of the exhaust gas through the partition walls, and "the purified gas from which the PM has been removed" flows out of the outflow cells.

Moreover, as the plugged honeycomb structure in recent years, there has been reported a plugged honeycomb structure constituted of two types of cells including large capacity cells having a relatively large area in a cross section perpendicular to a longitudinal direction, and small capacity cells having a relatively small area in the above cross section (see Patent Document 1). In this plugged honeycomb structure, the number of the large capacity cells is about the same as that of the small capacity cells. In this plugged honeycomb structure, a pressure loss during the collection of the ash, PM and the like is low, and the ash and PM can be collected in large amounts, as compared with a plugged honeycomb structure having one type of a cell shape (e.g., an only quadrangular shape) in a cross section of the structure which is orthogonal to a cell extending direction. Hereinafter, "the plugged honeycomb structure having the one type of cell shape (e.g., the only quadrangular shape) in the cross section of the structure which is orthogonal to the cell extending direction" will be referred to as "a conventional plugged honeycomb structure" sometimes.

[Patent Document 1] WO 2004/024294

SUMMARY OF THE INVENTION

A plugged honeycomb structure disclosed in Patent Document 1 can collect ash and particulate matter (PM) in large amounts. However, in the above plugged honeycomb structure, a pressure loss is larger in a state where the PM is not deposited or the amount of PM is small, as compared with the above "conventional plugged honeycomb structure". Here, in recent years, a diesel engine itself has been improved, and hence the amount of PM discharged from the diesel engine has decreased. On the other hand, owing to exhaust gas regulation, a filter (the plugged honeycomb structure) is also required for an engine such as a GDI engine which discharges a less amount of PM. Consequently, there has earnestly been demanded development of the filter (the plugged honeycomb structure) in which an increase of a pressure loss is suppressed in a state where the PM is not deposited or an amount of deposited PM is small, and in which ash and PM can be deposited in large amounts.

The present invention has been developed in view of the problems of such conventional technologies, and an object thereof is to provide a plugged honeycomb structure which can collect ash and particulate matter (PM) in large amounts and in which an increase of a pressure loss is suppressed in a state where the ash and PM are not deposited or an amount of deposited ash and PM is small.

According to the present invention, the following plugged honeycomb structure is provided.

[1] A plugged honeycomb structure comprising: a honeycomb structure section having porous partition walls with which a plurality of cells extending from an inflow side end surface to an outflow side end surface are formed to become through channels of a fluid, the plurality of cells including large cells and small cells having different open areas in a cross section perpendicular to an extending direction of the cells; inflow side plugged portions arranged in inflow side end portions of the predetermined cells including the large cells and the small cells among the plurality of cells; and outflow side plugged portions arranged in outflow side end portions of the remaining cells including the large cells and the small cells among the plurality of cells, wherein the predetermined cells are outflow cells having the plugged inflow side end portions and the open outflow side end portions, and the remaining cells are inflow cells having the plugged outflow side end portions and the open inflow side end portions.

[2] The plugged honeycomb structure according to the above [1], wherein a ratio of the number of the large cells provided with the inflow side plugged portions to the number of all the outflow cells is from 30 to 85%.

[3] The plugged honeycomb structure according to the above [1] or [2], wherein a ratio of the number of the large cells positioned in an outer peripheral portion of the honeycomb structure section and provided with the inflow side plugged portions to the number of all the large cells positioned in the outer peripheral portion of the honeycomb structure section is from 36 to 100%.

[4] The plugged honeycomb structure according to the above [1] or [2], wherein the large cells provided with the inflow side plugged portions and the small cells provided with the outflow side plugged portions are formed in the outer peripheral portion of the honeycomb structure section, and are not formed in a portion other than the outer peripheral portion.

[5] The plugged honeycomb structure according to any one of the above [1] to [4], wherein the honeycomb structure section is constituted of outer peripheral honeycomb segments constituting an outer periphery of the honeycomb structure section, and central honeycomb segments positioned on inner sides of the outer peripheral honeycomb segments.

In a plugged honeycomb structure of the present invention, large cells each having an open area larger than small cells are formed, and hence the large cells can collect ash and particulate matter (PM) in large amounts. Moreover, in the plugged honeycomb structure of the present invention, inflow cells and outflow cells are constituted of both the large cells and the small cells, respectively. Consequently, an increase of a pressure loss is suppressed in a state where the ash and PM are not deposited, or an amount of deposited ash and PM is small.

DETAILED DESCRIPTION OF THE INVENTION

Hereinafter, embodiments of the present invention will be described, but it should be understood that the present invention is not limited to the following embodiments and that the following embodiments to which modifications, improvements and the like are suitably added on the basis of ordinary knowledge of a person skilled in the art without departing from the gist of the present invention also fall in the gist of the present invention.

Figure 1:
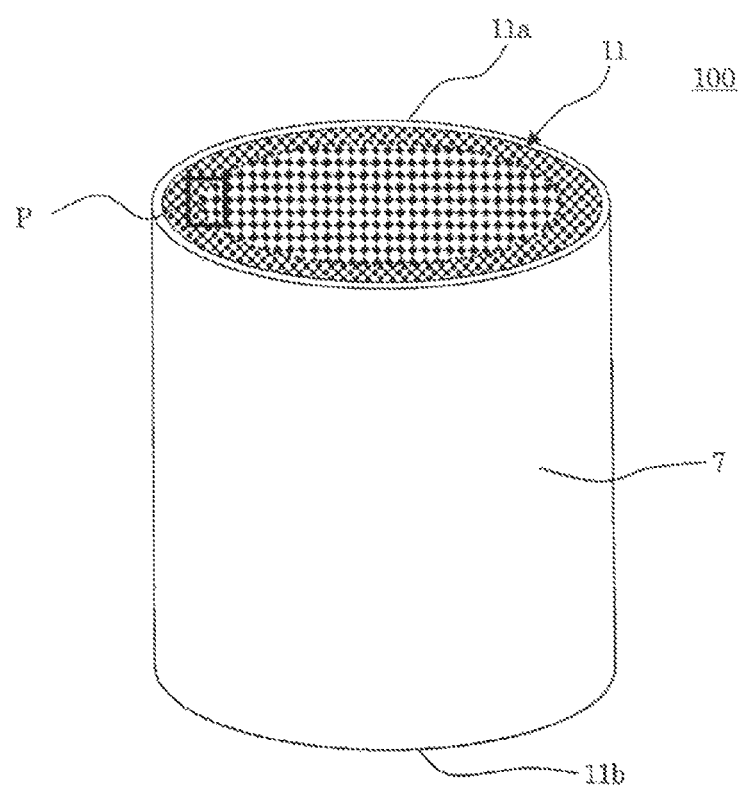
FIG. 1 is a perspective view schematically showing one embodiment of a plugged honeycomb structure of the present invention.
Figure 2:
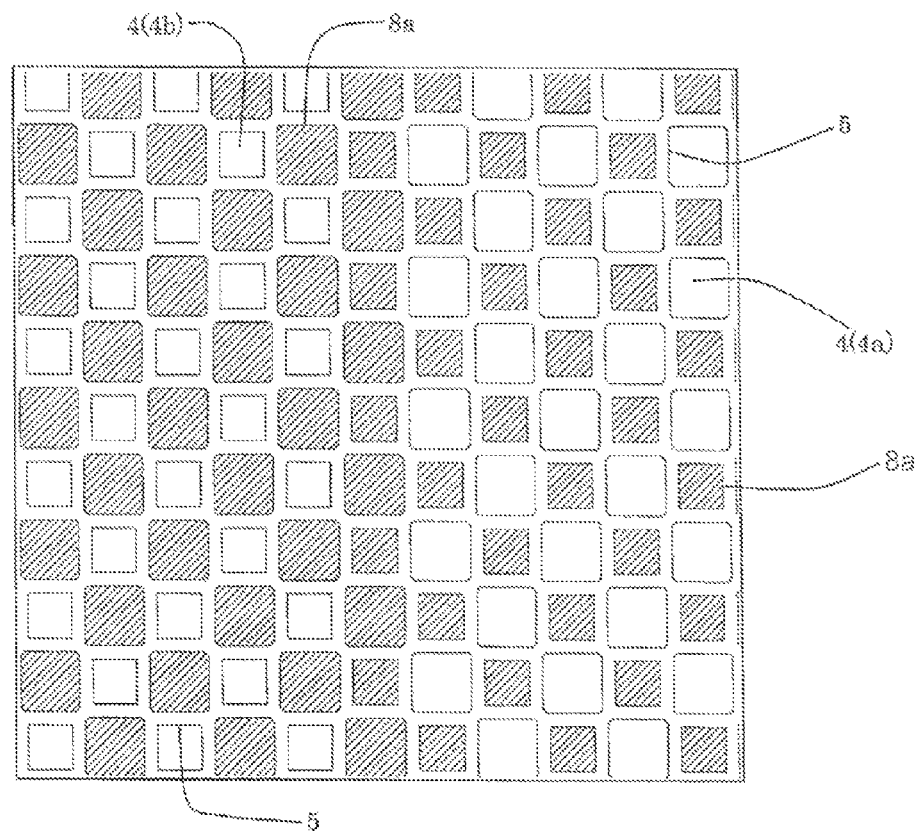
FIG. 2 is a plan view schematically showing an enlarged partial region P of one end surface of the plugged honeycomb structure shown in FIG. 1.

[1] Plugged Honeycomb Structure:

One embodiment of a plugged honeycomb structure of the present invention is, for example, a plugged honeycomb structure 100 shown in FIG. 1. The plugged honeycomb structure 100 includes a honeycomb structure section 11 having porous partition walls 5 with which a plurality of cells 4 (see FIG. 2) extending from an inflow side end surface 11a to an outflow side end surface 11b are formed to become through channels of a fluid. The plurality of cells 4 include large cells 4a (see FIG. 2) and small cells 4b (see FIG. 2) having different open areas in a cross section perpendicular to an extending direction of the cells 4. Moreover, the plugged honeycomb structure 100 includes inflow side plugged portions 8a arranged in inflow side end portions of the predetermined cells including the large cells 4a and the small cells 4b among the plurality of cells 4. Furthermore, the plugged honeycomb structure 100 includes outflow side plugged portions 8b arranged in outflow side end portions of the remaining cells including the large cells 4a and the small cells 4b among the plurality of cells 4. The predetermined cells are outflow cells having the plugged inflow side end portions and the open outflow side end portions in the honeycomb structure section 11. Moreover, the remaining cells are inflow cells having the plugged outflow side end portions and the open inflow side end portions in the honeycomb structure section 11. Furthermore, the plugged honeycomb structure 100 has an outer peripheral wall 7 disposed at an outer periphery of the honeycomb structure section 11. It is to be noted that the plugged honeycomb structure of the present invention does not necessarily have to have the outer peripheral wall 7. The outer peripheral wall 7 is preferably formed together with the partition walls 5 during extrusion forming of a formed honeycomb body in a process of preparing the honeycomb structure section 11. Moreover, the outer peripheral wall 7 may be formed by coating the outer periphery of the honeycomb structure section 11 with a ceramic material. FIG. 1 is a perspective view schematically showing the one embodiment of the plugged honeycomb structure of the present invention. FIG. 2 is a plan view schematically showing an enlarged partial region P of one end surface of the plugged honeycomb structure shown in FIG. 1.

In the plugged honeycomb structure 100, the large cells 4a each having an open area larger than the small cells 4b in the cross section perpendicular to the extending direction of the cells 4 are formed so that the large cells are open on the side of the inflow side end surface 11a. Therefore, in the plugged honeycomb structure 100, ash and particulate matter (PM) included in an exhaust gas are collected in large amounts, as compared with a plugged honeycomb structure in which only small cells are formed (the above "conventional plugged honeycomb structure"). That is, in the plugged honeycomb structure 100, the PM is collected in large amounts by the large cells 4a. Moreover, in the plugged honeycomb structure 100, the outflow cells and the inflow cells are constituted of both the large cells 4a and the small cells 4b, respectively, and hence an increase of a pressure loss is suppressed. In particular, an increase of an initial pressure loss (i.e., the pressure loss in a stage where an amount of deposited PM is small) is effectively suppressed. In other words, the increase of the pressure loss is effectively suppressed in a state where the ash and PM are not deposited, or the amount of deposited ash and PM is small. More specifically, when the outflow cells are the only small cells, a sum of open areas of the outflow cells is smaller than a sum of open areas of the inflow cells, and hence the pressure loss increases. To solve the problem, part of the outflow cells are constituted of the large cells, thereby increasing the sum of the open areas of the outflow cells. In consequence, the increase of the pressure loss is suppressed.

In the plugged honeycomb structure 100, a ratio of the number of the large cells 4a provided with the inflow side plugged portions to the number of all the outflow cells is preferably from 30 to 85%. The ratio of the number of the large cells 4a provided with the inflow side plugged portions is further preferably from 35 to 80%, and especially preferably from 40 to 75%. When the ratio of the number of the large cells 4a provided with the inflow side plugged portions is in the above range, a hydraulic diameter of each of the outflow cells increases. Therefore, the increase of the initial pressure loss is suitably suppressed. It is to be noted that when the above ratio is in excess of 85%, the increase of the pressure loss is suitably suppressed, but a function of collecting the ash and PM might not sufficiently be obtained. On the other hand, when the ratio is smaller than 30%, the effect of suppressing the increase of the initial pressure loss might not sufficiently be obtained.

Moreover, in the plugged honeycomb structure 100, a ratio of the number of the large cells 4a positioned in an outer peripheral portion of the honeycomb structure section 11 and provided with the inflow side plugged portions to the number of all the large cells 4a positioned in the outer peripheral portion of the honeycomb structure section is preferably from 36 to 100%. The above "ratio of the number of the large cells 4a positioned in the outer peripheral portion and provided with the inflow side plugged portions" is further preferably from 42 to 95%, and especially preferably from 48 to 89%. When the above "ratio of the number of "the large cells 4a" positioned in the outer peripheral portion and "provided with the inflow side plugged portions"" is in the above range and the plugged honeycomb structure is mounted on a car or the like, the increase of the initial pressure loss is further suitably suppressed. That is, as to a usual exhaust pipe, a connecting portion of a purifying device containing the plugged honeycomb structure is conical (conic), and a front edge of the exhaust pipe is disposed to face a central portion of the plugged honeycomb structure. Therefore, more PM included in the exhaust gas is deposited in the central portion of the plugged honeycomb structure, and the PM is not easily deposited in the outer peripheral portion of the plugged honeycomb structure. To solve the problem, the large cells are formed as the outflow cells in the outer peripheral portion which does not easily contribute to the collection of the PM. Consequently, the increase of the pressure loss can suitably be suppressed without noticeably lowering a collecting efficiency. When the above ratio is smaller than a lower limit value, the sum of the open areas of the outflow cells noticeably decreases, so that the initial pressure loss might increase. On the other hand, when the ratio is in excess of an upper limit value, the sum of the open areas of the inflow cells which influences the collecting efficiency of the ash and PM noticeably decreases. Therefore, a function of collecting the ash and PM might not sufficiently be obtained.

Here, when the honeycomb structure section has a so-called integral structure, "the outer peripheral portion of the honeycomb structure section" is a portion in a region from the outer periphery of the cylindrical honeycomb structure section to a position of a length of 30% of a diameter of the honeycomb structure section. When the honeycomb structure section has a shape other than the cylindrical shape (e.g., a quadrangular pillar-like shape), the outer peripheral portion is a portion in a region from the outer periphery of the honeycomb structure section to a position of a length of 40% of "the longest diameter". It is to be noted that when the honeycomb structure section is constituted of a plurality of honeycomb segments, the outer peripheral portion is preferably constituted of honeycomb segments constituting an outer peripheral surface of the honeycomb structure section (outer peripheral honeycomb segments) irrespective of the above regulation.

It is to be noted that the honeycomb structure section 11 is preferably constituted of the plurality of honeycomb segments. Specifically, the honeycomb structure section 11 is preferably constituted of outer peripheral honeycomb segments 21 constituting the outer periphery of the honeycomb structure section 11, and central honeycomb segments 22 positioned on inner sides of the outer peripheral honeycomb segments 21. When the honeycomb structure section 11 is constituted of the outer peripheral honeycomb segments 21 constituting the outer periphery of the honeycomb structure section 11 and the central honeycomb segments 22 positioned on the inner sides of the outer peripheral honeycomb segments 21, the honeycomb structure section preferably has the following constitution. That is, it is preferable that all the large cells 4a of the outer peripheral honeycomb segments 21 are the outflow cells and that all the small cells 4b of the outer peripheral honeycomb segments are the inflow cells. It is preferable that all the large cells 4a of the central honeycomb segments 22 are the inflow cells and that all the small cells 4b of the central honeycomb segments are the outflow cells. In the honeycomb structure section 11, the outflow side end surfaces and inflow side end surfaces of the central honeycomb segments 22 are arranged inversely to those of the outer peripheral honeycomb segments 21. Therefore, the plugged honeycomb structure 100 can easily be prepared.

[1-1] Honeycomb Structure Section:

In the plugged honeycomb structure 100, there is not any special restriction on a shape of the honeycomb structure section 11, but examples of the shape preferably include a cylindrical shape, a tubular shape with elliptic end surfaces, and prismatic pillar-like shapes with end surfaces having polygonal shapes such as "a regular square shape, a rectangular shape, a triangular shape, a pentagonal shape, a hexagonal shape and an octagonal shape". The honeycomb structure section 11 shown in FIG. 1 is an example of the cylindrical shape.

Figure 3:
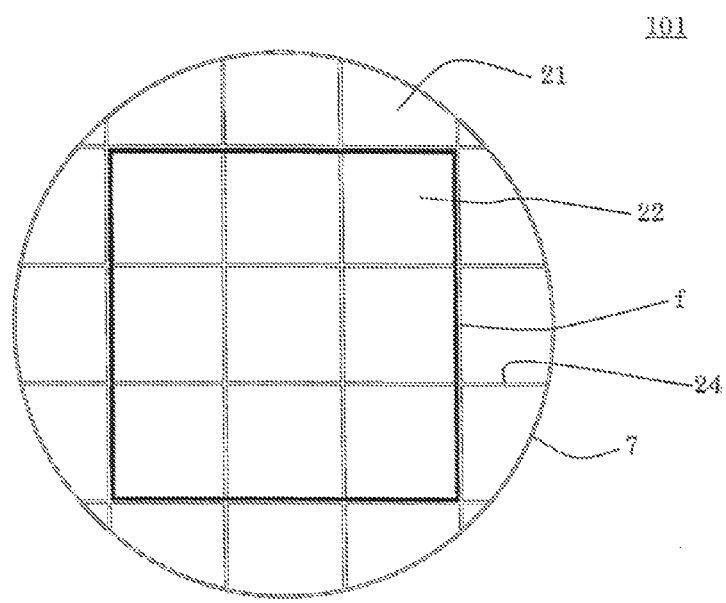
FIG. 3 is a plan view schematically showing one end surface of another embodiment of the plugged honeycomb structure of the present invention.
Figure 4:
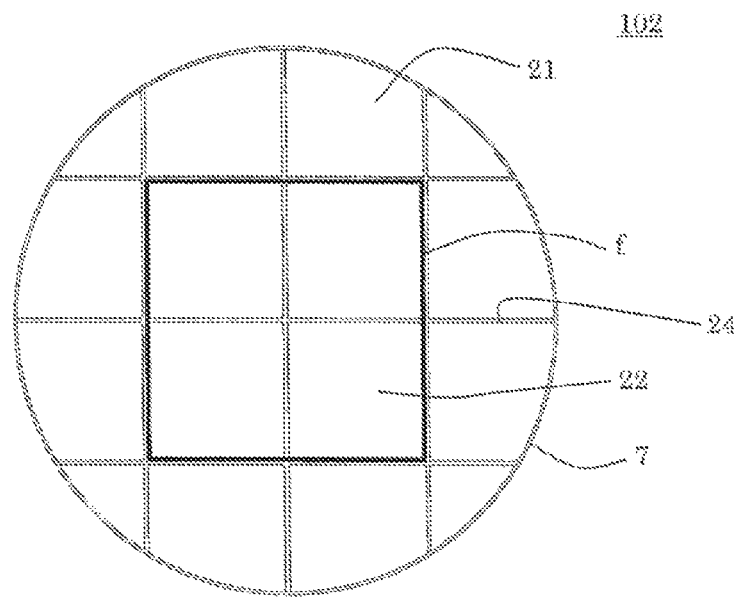
FIG. 4 is a plan view schematically showing one end surface of still another embodiment of the plugged honeycomb structure of the present invention.
Figure 5:
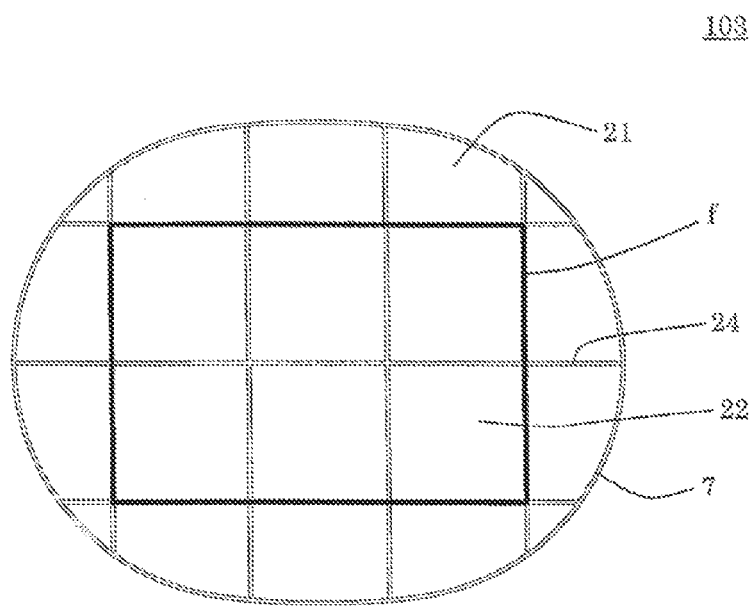
FIG. 5 is a plan view schematically showing one end surface of a further embodiment of the plugged honeycomb structure of the present invention.

The honeycomb structure section 11 may include the plurality of honeycomb segments 21 or 22 each having porous partition walls 5 with which a plurality of cells extending from an inflow side end surface to an outflow side end surface are formed to become through channels of a fluid, as in plugged honeycomb structures 101 to 103 shown in FIG. 3 to FIG. 5. The plurality of honeycomb segments 21 or 22 are joined by a joining material 24 in a state where side surfaces of the honeycomb segments face each other.

The plugged honeycomb structure 101 shown in FIG. 3 is constituted of 16 outer peripheral honeycomb segments 21 constituting an outer periphery of a cylindrical honeycomb structure section 11 and nine central honeycomb segments 22 positioned on inner sides of the outer peripheral honeycomb segments 21. It is to be noted that the central honeycomb segments 22 are the nine honeycomb segments surrounded with a bold line f. FIG. 3 is a plan view schematically showing one end surface of another embodiment of the plugged honeycomb structure of the present invention.

The plugged honeycomb structure 102 shown in FIG. 4 is constituted of 12 outer peripheral honeycomb segments 21 constituting an outer periphery of a cylindrical honeycomb structure section 11 and four central honeycomb segments 22 positioned on inner sides of the outer peripheral honeycomb segments 21. It is to be noted that the central honeycomb segments 22 are the four honeycomb segments surrounded with a bold line f. FIG. 4 is a plan view schematically showing one end surface of still another embodiment of the plugged honeycomb structure of the present invention.

The plugged honeycomb structure 103 shown in FIG. 5 is constituted of 14 outer peripheral honeycomb segments 21 constituting an outer periphery of an elliptic tubular honeycomb structure section 11 and six central honeycomb segments 22 positioned on inner sides of the outer peripheral honeycomb segments 21. It is to be noted that the central honeycomb segments 22 are the six honeycomb segments surrounded with a bold line f. FIG. 5 is a plan view schematically showing one end surface of a further embodiment of the plugged honeycomb structure of the present invention.

In the plugged honeycomb structure of the present invention, the large cells and the small cells are alternately arranged via the partition walls. Moreover, one of end portions of each of the large and small cells in the honeycomb structure section is plugged by a plugged portion. For example, in the plugged honeycomb structure 100, the large cells 4a and the small cells 4b are alternately arranged via the partition walls 5. In a central portion of the honeycomb structure section 11, the large cells 4a are the inflow cells, and in an outer peripheral portion of the honeycomb structure section 11, the small cells 4b are the inflow cells. That is, in the plugged honeycomb structure 100, the large cells 4a and the small cells 4b are alternately arranged via the partition walls 5. In the central portion of the honeycomb structure section 11, the small cells 4b are the outflow cells, and in the outer peripheral portion of the honeycomb structure section 11, the large cells 4a are the outflow cells. According to such a constitution, in the central portion of the honeycomb structure section 11, the fluid which has flowed into the large cells 4a as the inflow cells passes through the partition walls 5 to flow into the small cells 4b as the outflow cells, and is discharged from open frontal areas of the outflow cells in the outflow side end surface. When the fluid moves from the inflow cells to the outflow cells, the PM in the fluid is collected by the porous partition walls.

Each of the large cells is a large cell having a larger open area than the small cell in the cross section perpendicular to the cell extending direction, and a shape of the large cell may be any shape that has a larger open area than the small cell in the cross section perpendicular to the cell extending direction. Examples of the cell shape include polygonal shapes such as a triangular shape, a quadrangular shape, a hexagonal shape and an octagonal shape. In particular, it is preferable that a large cell shape is the octagonal shape and that a small cell shape is the quadrangular shape. In this case, a length of each of "four sides" of the large cell "which are adjacent to the small cells via the partition walls" is further preferably the same as a width of the small cell. According to such a constitution, a mechanical strength of the plugged honeycomb structure can be enhanced.

The open area of each of the large cells is preferably from 1.2 to 5.5 times, further preferably from 1.3 to 4.7 times, and especially preferably from 1.4 to 4.3 times the open area of each of the small cells. When a ratio of the open area of the large cell to the open area of the small cell satisfies the above range, a volume of the inflow cell moderately increases. Therefore, a collecting capacity of the ash and PM increases. When the ratio is smaller than the above lower limit value, the volume of the inflow cell does not sufficiently increase. Therefore, the collecting capacity of the ash and PM might not sufficiently be increased. When the ratio is in excess of the above upper limit value, the hydraulic diameter of the outflow cell excessively decreases, which might cause a defect that the initial pressure loss noticeably increases. It is to be noted that the open areas of the large and small cells are values measured as follows. That is, there are first assumed a vertical line and a horizontal line passing through the center of the plugged honeycomb structure and crossing each other at right angles in a cross section of the plugged honeycomb structure which is orthogonal to the cell extending direction. Then, from "the cells which are not provided with the plugged portions" through which the vertical line passes, five or more cells are arbitrarily selected at an equal space. Moreover, from "the cells which are not provided with the plugged portions" through which the horizontal line passes, five or more cells are arbitrarily selected at an equal space. Afterward, an open width of each of the arbitrarily selected cells is measured. "The open width of the cell" is a length between the partition walls facing each other. It is to be noted that when the honeycomb structure section is constituted of the plurality of honeycomb segments, a vertical line and a horizontal line of each of the honeycomb segments are assumed by a method similar to that of the above "plugged honeycomb structure", and the cells are arbitrarily selected. Afterward, an open width of each of the arbitrarily selected cells is measured. Next, the open area is calculated from an average value of the measured open widths. In consequence, the open areas of the large cell and the small cell are determined.

A thickness of each of the partition walls 5 constituting the honeycomb structure section 11 in the cross section perpendicular to the extending direction of the cells 4 (hereinafter referred to simply as "the thickness of the partition wall 5" sometimes) is basically uniform. "Basically uniform" means that the thicknesses of the partition walls are uniform except for a case where a small difference in thickness between the partition walls is made, for example, due to deformation at formation. That is, in the plugged honeycomb structure of the present invention, any differences in thickness between the partition walls are not intentionally made, and the thicknesses of the partition walls are uniform in the above cross section. For example, when a slit of a die (a mold) for extrusion-forming of the honeycomb structure section is manufactured by slicer processing, the above partition walls having the uniform thickness are realized.

The thickness of the partition wall 5 is preferably from 64 to 508 µm, further preferably from 89 to 381 µm, and especially preferably from 110 to 305 µm. When the thickness of the partition wall 5 is in the above range, a strength of the plugged honeycomb structure 100 can be maintained, and the increase of the initial pressure loss can further be suppressed. When the thickness is smaller than 64 µm, the strength of the plugged honeycomb structure 100 deteriorates sometimes. When the thickness is larger than 508 µm, the initial pressure loss of the plugged honeycomb structure 100 increases sometimes. The above thickness of the partition wall 5 is the thickness of the partition wall in a portion which separates the large cell and the small cell from each other.

A porosity of the partition wall 5 is preferably from 35 to 70%, further preferably from 40 to 70%, and especially preferably from 40 to 65%. When the porosity of the partition wall 5 is in the above range, the strength of the plugged honeycomb structure 100 can be maintained, and the increase of the initial pressure loss can further be suppressed. When the porosity is smaller than 35%, the initial pressure loss of the plugged honeycomb structure 100 increases sometimes. When the porosity is larger than 70%, the strength of the plugged honeycomb structure 100 deteriorates sometimes. The porosity is a value measured by a mercury porosimeter.

An average pore diameter of the partition walls 5 is preferably from 7 to 30 µm, further preferably from 8 to 27 µm, and especially preferably from 9 to 25 µm. When the average pore diameter of the partition walls 5 is in the above range, the strength of the plugged honeycomb structure 100 can be maintained, and the increase of the initial pressure loss can further be suppressed. When the average pore diameter is smaller than 7 µm, the initial pressure loss of the plugged honeycomb structure 100 increases sometimes. When the average pore diameter is larger than 30 µm, a collecting performance of the ash and PM deteriorates sometimes. The average pore diameter is a value measured by the mercury porosimeter.

There is not any special restriction on a cell density of the honeycomb structure section 11, but the cell density is preferably from 15 to 62 cells/cm$^2$, and further preferably from 31 to 56 cells/cm$^2$. When the cell density is in the above range, the pressure loss can be minimized while maintaining the strength of the honeycomb structure section. When the cell density is smaller than 15 cells/cm$^2$, the strength of the honeycomb structure section deteriorates. Therefore, the honeycomb structure section might break down at canning. When the cell density is larger than 62 cells/cm², the initial pressure loss excessively increases. Therefore, an engine output might decrease, and a fuel efficiency might deteriorate.

A material of the partition walls 5 is preferably a ceramic material. Because of excellent strength and heat resisting properties, the material is further preferably at least one selected from the group consisting of cordierite, silicon carbide, a silicon-silicon carbide composite material, mullite, alumina, aluminum titanate, silicon nitride, and a silicon carbide-cordierite composite material. Among these materials, cordierite is especially preferable.

As a material of the plugged portions (the inflow side plugged portions 8a and the outflow side plugged portions 8b), for example, the same material as the material of the partition walls 5 can be used, and the same material as that of the partition walls 5 is preferably used.

A length L of the plugged honeycomb structure 100 in the cell extending direction is preferably from 50 to 381 mm, further preferably from 70 to 330 mm, and especially preferably from 100 to 305 mm. When the length is in the above range, the collecting capacity in accordance with an amount of the PM discharged from various engines can be acquired in a limited space.

A diameter D of the cross section of the plugged honeycomb structure 100 which is orthogonal to the cell extending direction is preferably from 50 to 381 mm, further preferably from 70 to 330 mm, and especially preferably from 100 to 305 mm. When the diameter D is in the above range, the collecting capacity in accordance with the amount of the PM discharged from various engines can be acquired in the limited space.

A value of the above length L/the above diameter D of the plugged honeycomb structure 100 is preferably from 0.5 to 2, further preferably from 0.6 to 1.7, and especially preferably from 0.7 to 1.6. In the above range, ring cracks can be suppressed.

[2] Manufacturing Method of Plugged Honeycomb Structure:

A manufacturing method of the plugged honeycomb structure of the present invention will be described. First, a kneaded material for preparation of the honeycomb structure section is prepared, and this kneaded material is formed to prepare a formed honeycomb body (a forming step). In the formed honeycomb body to be prepared, two types of cells (the large cell and the small cell) having different open areas in the cross section perpendicular to the cell extending direction are alternately formed via the partition wall. A shape, a size (a sectional area) and the like of each cell can suitably be determined in conformity to the preferable cell example described above in the plugged honeycomb structure of the present embodiment.

Next, the obtained formed honeycomb body (or a dried honeycomb body subjected to drying performed as required) is fired to prepare the honeycomb structure section (a honeycomb structure section preparing step).

Next, the open frontal areas of the predetermined cells including the large cells and the small cells in one end portion (an inflow side end portion) of the formed honeycomb body and the open frontal areas of the remaining cells including the large cells and the small cells in the other end portion (an outflow side end portion) of the body are provided with the plugged portions. In this way, the inflow side plugged portions and the outflow side plugged portions are formed (a plugging step). As described above, the plugged honeycomb structure of the present invention can be manufactured. Hereinafter, each manufacturing step will further specifically be described.

[2-1] Forming Step:

First, in the forming step, a ceramic forming raw material containing a ceramic raw material is formed, to obtain the formed honeycomb body in which the plurality of cells are formed to become the through channels of the fluid.

Examples of the ceramic raw material contained in the ceramic forming raw material include silicon carbide (SiC), a silicon-silicon carbide composite material formed by using silicon carbide (SiC) as an aggregate and silicon (Si) as a binding agent, silicon nitride, a cordierite forming raw material, cordierite, mullite, alumina, titania, silicon carbide, and aluminum titanate. Moreover, the material is preferably at least one selected from the group consisting of silicon carbide (SiC), the silicon-silicon carbide composite material, the cordierite forming raw material, cordierite, mullite, alumina, titania, silicon carbide, and aluminum titanate. It is to be noted that "the cordierite forming raw material" is a ceramic raw material blended so as to obtain a chemical composition which falls in ranges of 42 to 56 mass % of silica, 30 to 45 mass % of alumina, and 12 to 16 mass % of magnesia, and the material is fired to become cordierite.

Moreover, this ceramic forming raw material is preferably prepared by mixing the above ceramic raw material with a dispersion medium, an organic binder, an inorganic binder, a pore former, a surfactant and the like. There is not any special restriction on a composition ratio of each raw material, and the composition ratio is preferably determined in accordance with a structure, a material and the like of the honeycomb structure section to be prepared.

In the formation of the ceramic forming raw material, it is preferable that the forming raw material is first kneaded to obtain the kneaded material and that the obtained kneaded material is formed into a honeycomb shape. There is not any special restriction on a method of kneading the forming raw material to form the kneaded material, and an example of the method is a method using a kneader, a vacuum clay kneader or the like. There is not any special restriction on a method of forming the kneaded material to obtain the formed honeycomb body, and a heretofore known forming method such as extrusion forming or injection forming can be used. An example of the method is preferably a method of performing the extrusion forming by use of a die having a desirable cell shape, partition wall thickness and cell density to obtain the formed honeycomb body. A material of the die is preferably a super hard alloy which does not easily wear out.

There is not any special restriction on a shape of the formed honeycomb body, and examples of the shape include a cylindrical shape (a columnar shape), and a tubular shape (a pillar-like shape) in which a cross section orthogonal to a central axis has an elliptic shape, a race track shape, or a polygonal shape such as a triangular shape, a quadrangular shape, a pentangular shape, a hexagonal shape or an octagonal shape. When the honeycomb structure section to be prepared is prepared by joining a plurality of honeycomb segments, the shape of the formed honeycomb body is preferably a tubular shape (a pillar-like shape) in which a cross section orthogonal to a central axis has a polygonal shape such as a triangular shape, a quadrangular shape, a pentangular shape, a hexagonal shape or an octagonal shape. This is because one honeycomb structure section is easily prepared by combining these segments.

Moreover, after the above formation, the obtained formed honeycomb body my be dried. There is not any special restriction on a drying method, but examples of the method include hot air drying, microwave drying, dielectric drying, reduced pressure drying, vacuum drying, and freeze drying. Among these methods, the dielectric drying, the microwave drying or the hot air drying is preferably performed alone or a combination of the methods is preferably performed.

[2-2] Honeycomb Structure Section Preparing Step:

Next, the obtained formed honeycomb body is fired to obtain the honeycomb structure section. It is to be noted that the firing of the formed honeycomb body may be performed after arranging the plugged portions in the formed honeycomb body.

Moreover, the formed honeycomb body is preferably calcinated prior to the firing (main firing) of the formed honeycomb body. The calcinating is performed for the purpose of degreasing, and there is not any special restriction on a calcinating method. The method may be any method capable of removing an organic substance (the organic binder, the dispersant, the pore former, etc.) in the formed honeycomb body. In general, a burning temperature of the organic binder is from about 100 to 300° C., and a burning temperature of the pore former is from about 200 to 800° C. Therefore, as calcinating conditions, it is preferable that heating is performed at about 200 to 1000° C. in an oxidation atmosphere for about three to 100 hours.

The firing (the main firing) of the formed honeycomb body is performed for the purpose of sintering and densifying the forming raw material constituting the calcinated formed body to secure a predetermined strength. Firing conditions (temperature, time and atmosphere) vary in accordance with the type of the forming raw material, and hence suitable conditions may be selected in accordance with the type. For example, when the cordierite forming raw material is used, the firing temperature is preferably from 1410 to 1440° C. Moreover, the firing time, as time to keep the highest temperature, is preferably from four to six hours.

It is to be noted that when the honeycomb structure section is constituted of a plurality of honeycomb segments, a plurality of formed honeycomb bodies or fired formed honeycomb bodies are joined by the joining material in a state where the bodies are arranged adjacent to each other so that side surfaces of the bodies face each other. As the joining material, a heretofore known joining material can be used.

[2-3] Plugging Step:

Next, in the honeycomb structure section, the open frontal areas of the predetermined cells including the large cells and the small cells and the open frontal areas of the remaining cells including the large cells and the small cells are charged with a plugging material, to form the inflow side plugged portions and the outflow side plugged portions.

When the honeycomb structure section is charged with the plugging material, one end portion side is first charged with the plugging material, and then the other end portion side is charged with the plugging material. An example of a method of charging the one end portion side with the plugging material is a method having the following masking step and press-in step. The masking step is a step of attaching a sheet to one end surface (e.g., the inflow side end surface) of the honeycomb structure section and making holes at positions which overlap with "the cells to be provided with the plugged portions" in the sheet. The press-in step is a step of pressing "the end portion of the honeycomb structure section to which the sheet has been attached" into a container containing the plugging material, to press the plugging material into the cells of the honeycomb structure section. When the plugging material is pressed into the cells of the honeycomb structure section, the plugging material passes through the holes made in the sheet so that the only cells communicating with the holes made in the sheet are charged.

Next, the plugging material with which the honeycomb structure section has been charged is dried to form the plugged portions, thereby obtaining the plugged honeycomb structure. It is to be noted that after charging both the end portions of the honeycomb structure section with the plugging material, the plugging material may be dried. Moreover, after drying the plugging material with which the one end portion of the honeycomb structure section has been charged, the other end portion may be charged with the plugging material, and then the plugging material with which the other end portion has been charged may be dried. Furthermore, the plugging material may be fired for the purpose of more securely fixing the material. Additionally, the formed honeycomb body before or after the drying may be charged with the plugging material, and the plugging material may be fired together with the formed honeycomb body before or after the drying.

It is to be noted that when the honeycomb structure section is formed by joining the plurality of honeycomb segments, the honeycomb structure section can be prepared as follows. That is, first, a plurality of "honeycomb segments having the plugged portions" of the same structure are prepared. Afterward, the segments to become the outer peripheral honeycomb segments may be arranged so that the outflow side end surfaces and inflow side end surfaces of the outer peripheral honeycomb segments are arranged inversely to those of the central honeycomb segments. In other words, when the plurality of "honeycomb segments having the plugged portions" are combined, the only segments to become the outer peripheral honeycomb segments may be arranged by rotating the segments as much as 180° to the central honeycomb segments around a straight line orthogonal to the central axis parallel to the cell extending direction. When such a method is employed, the plugged honeycomb structures shown in FIG. 3 to FIG. 5 can easily be prepared only by changing the arrangement. That is, when the plugged portions are formed after combining the plurality of "honeycomb segments having no plugged portions", determination of the positions where the holes are to be made in the sheet is laborious in the above masking step. However, according to the above method, the plugged honeycomb structure can easily be prepared only by changing the arrangement. In "the honeycomb segments having the plugged portions", the plurality of cells are formed so that the large cell and the small cell are arranged adjacent to each other, and the plugged portions are alternately arranged so as to form so-called checkered patterns in both the end surfaces.

As described above, the plugged honeycomb structure of the present invention can be manufactured. However, the manufacturing method of the plugged honeycomb structure of the present invention is not limited to the above-mentioned manufacturing method.

EXAMPLES

Hereinafter, examples of the present invention will specifically be described, but the present invention is not limited to these examples.

Example 1

As honeycomb segment raw materials, SiC powder and metal Si powder were mixed at a mass ratio of 80:20. To this mixture, starch and resin balloon were added as pore formers, and methylcellulose, hydroxypropoxyl methylcellulose, surfactant and water were further added, to prepare a kneaded material having a plasticity. This kneaded material was subjected to extrusion forming, to obtain 16 formed honeycomb segment bodies. In a cross section of each of these formed honeycomb segment bodies which were perpendicular to a cell extending direction, octagonal cells (inflow cells) and quadrangular cells (outflow cells) were alternately formed via partition walls.

The obtained formed honeycomb segment bodies were dried, degreased at 400° C. in the air atmosphere, and then fired at 1450° C. in Ar inert atmosphere. In this way, honeycomb segments were obtained.

Moreover, the whole shape of each of the formed honeycomb segment bodies was a regular quadrangular pillar-like shape.

Next, end surfaces (an inflow side end surface and an outflow side end surface) of each formed honeycomb segment body were masked. At this time, masked cells and cells which were not masked were alternately arranged. Specifically, a mask which was not provided with any holes was applied to each end surface, and the holes were made in portions of this mask which closed the cells to be provided with plugged portions. Then, an end portion of the body on a masked side was immersed into a plugging slurry, to charge, with the plugging slurry, open frontal areas of the cells which were not masked. In this way, plugged formed honeycomb segment bodies were obtained in which the open frontal areas of inflow side end portions of the predetermined cells and the open frontal areas of outflow side end portions of the remaining cells were charged with the plugging slurry. As the plugging slurry, a slurry containing a material similar to the honeycomb segment raw material was used.

Next, the plugged formed honeycomb segment bodies were heated at 450° C. for five hours to perform degreasing, and further heated at 1425° C. for seven hours to perform firing, thereby obtaining plugged honeycomb segments. In the plugged honeycomb segments, a partition wall thickness was 0.31 mm, a large cell width was 1.35 mm, and a small cell width was 1.01 mm. The above "large cell width" was the maximum length of the large cell which was measured in a direction parallel to one side of a quadrangular (square) small cell (hereinafter, this also applies). Moreover, in the plugged honeycomb segments, one side of an end surface was 36.2 mm, and a length in a cell extending direction was 254.0 mm. In the plugged honeycomb segments, a partition wall porosity was 41%. An average pore diameter of the partition walls was 14 μm. A cell density was 46.5 cells/cm$^2$. An open area of the large cell was 0.91 mm$^2$, and an open area of the small cell was 0.51 mm$^2$.

Next, these plugged honeycomb segments were joined by a joining material in a state where the segments were arranged adjacent to each other so that side surfaces of the segments faced each other. Specifically, first, the side surface of one of the plugged honeycomb segments (a central honeycomb segment) was coated with a joining material composition to form a joining material layer, and another plugged honeycomb segment (another central honeycomb segment) was disposed on this joining material layer. This step was repeated to obtain a joined central honeycomb segment assembly of two vertical segments×two horizontal segments. Afterward, on side surfaces of the joined central honeycomb segment assembly, there were arranged 12 plugged honeycomb segments (outer peripheral honeycomb segments) rotated as much as 180° to the joined central honeycomb segment assembly around a straight line orthogonal to a central axis parallel to the cell extending direction. In this way, a joined honeycomb segment assembly of four vertical segments×four horizontal segments was obtained. Then, an outer periphery of this joined honeycomb segment assembly was cut so as to obtain a cylindrical shape, and then this outer periphery was coated with a coating material, to perform drying and hardening at 700° C. for two hours. In this way, a plugged honeycomb structure was obtained.

In the obtained plugged honeycomb structure, a length in the cell extending direction was 254.0 mm, and a diameter was 143.8 mm. "A ratio of the number of the large cells provided with inflow side plugged portions to the number of all the outflow cells" was 67% (described as "plugged large cell ratio (%)" in Table 1). Moreover, "a ratio of the number of "the large cells provided with the inflow side plugged portions" positioned in an outer peripheral portion of a honeycomb structure section to the number of all the large cells positioned in the outer peripheral portion of the honeycomb structure section" was 80% (described as "a ratio (%) of the plugged large cells of the outer peripheral portion" in Table 1). The results are shown in Table 1. It is to be noted that in the plugged honeycomb structure of the present example, the honeycomb structure section is formed by joining the plurality of honeycomb segments (a segment structure), and "the segment structure" is described in a column of "the structure of a honeycomb structure body" in Table 1. When the honeycomb structure section is not constituted of the honeycomb segments and is not formed by combining the plurality of honeycomb segments, "an integral structure" is described.

In the plugged honeycomb structure of the present example, the large cells provided with the inflow side plugged portions and the small cells provided with outflow side plugged portions were formed in the outer peripheral portion of the honeycomb structure section, and were not formed in a portion other than the outer peripheral portion. Specifically, in the plugged honeycomb structure of the present example, the large cells provided with the inflow side plugged portions and the small cells provided with the outflow side plugged portions were formed only in the outer peripheral portion of the honeycomb structure section.

TABLE 1

| | Length (mm) | Dia. (mm) | Integral structure/ segment structure | Partition wall thickness (mm) | Porosity (%) | Average pore dia. (μm) | Cell density (cells/cm$^2$) | Large cell width (mm) | Small cell width (mm) | Large cell open area (mm$^2$) | Small cell open area (mm$^2$) | Ratio of plugged large cells (%) | Ratio of plugged large cells of outer peripheral portion (%) |
|---|---|---|---|---|---|---|---|---|---|---|---|---|---|
| Example 1 | 254.0 | 143.8 | Segment structure | 0.31 | 42 | 14 | 46.5 | 1.35 | 1.01 | 0.91 | 0.51 | 67 | 80 |
| Example 2 | 150.5 | 143.8 | Segment structure | 0.38 | 42 | 14 | 24.8 | 1.99 | 1.27 | 1.91 | 0.81 | 66 | 79 |
| Comparative Example 1 | 254.0 | 143.8 | Segment structure | 0.31 | 42 | 14 | 46.5 | 1.35 | 1.01 | 0.91 | 0.51 | 0 | 0 |
| Comparative Example 2 | 150.5 | 143.8 | Segment structure | 0.38 | 42 | 14 | 24.8 | 1.99 | 1.27 | 1.91 | 0.81 | 0 | 0 |

TABLE 1-continued

|  | Length (mm) | Dia. (mm) | Integral structure/ segment structure | Partition wall thickness (mm) | Porosity (%) | Average pore dia. (μm) | Cell density (cells/cm²) | Large cell width (mm) | Small cell width (mm) | Large cell open area (mm²) | Small cell open area (mm²) | Ratio of plugged large cells (%) | Ratio of plugged large cells of outer peripheral portion (%) |
|---|---|---|---|---|---|---|---|---|---|---|---|---|---|
| Comparative Example 3 | 254.0 | 143.8 | Segment structure | 0.31 | 42 | 14 | 46.5 | 1.35 | 1.01 | 0.91 | 0.51 | 100 | 100 |
| Comparative Example 4 | 150.5 | 143.8 | Segment structure | 0.38 | 42 | 14 | 24.8 | 1.99 | 1.27 | 1.91 | 0.81 | 100 | 100 |
| Comparative Example 5 | 150.5 | 143.8 | Segment structure | 0.38 | 42 | 14 | 24.8 | 1.99 | 1.27 | 1.91 | 0.81 | 0 | 0 |
| Example 3 | 150.5 | 143.8 | Segment structure | 0.38 | 42 | 14 | 24.8 | 1.99 | 1.27 | 1.91 | 0.81 | 25 | 30 |
| Example 4 | 150.5 | 143.8 | Segment structure | 0.38 | 42 | 14 | 24.8 | 1.99 | 1.27 | 1.91 | 0.81 | 30 | 36 |
| Example 5 | 150.5 | 143.8 | Segment structure | 0.38 | 42 | 14 | 24.8 | 1.99 | 1.27 | 1.91 | 0.81 | 60 | 71 |
| Example 6 | 150.5 | 143.8 | Segment structure | 0.38 | 42 | 14 | 24.8 | 1.99 | 1.27 | 1.91 | 0.81 | 85 | 100 |
| Example 7 | 150.5 | 143.8 | Segment structure | 0.38 | 42 | 14 | 24.8 | 1.99 | 1.27 | 1.91 | 0.81 | 90 | 100 |

[Measurement of Pressure Loss (kPa)]:

Pressure losses were measured by changing a type of a gas to be supplied to the plugged honeycomb structure. Specifically, the pressure loss at the supply of a gas (air) which did not include soot and the pressure loss at the supply of an exhaust gas including the soot were measured.

Figure 6:
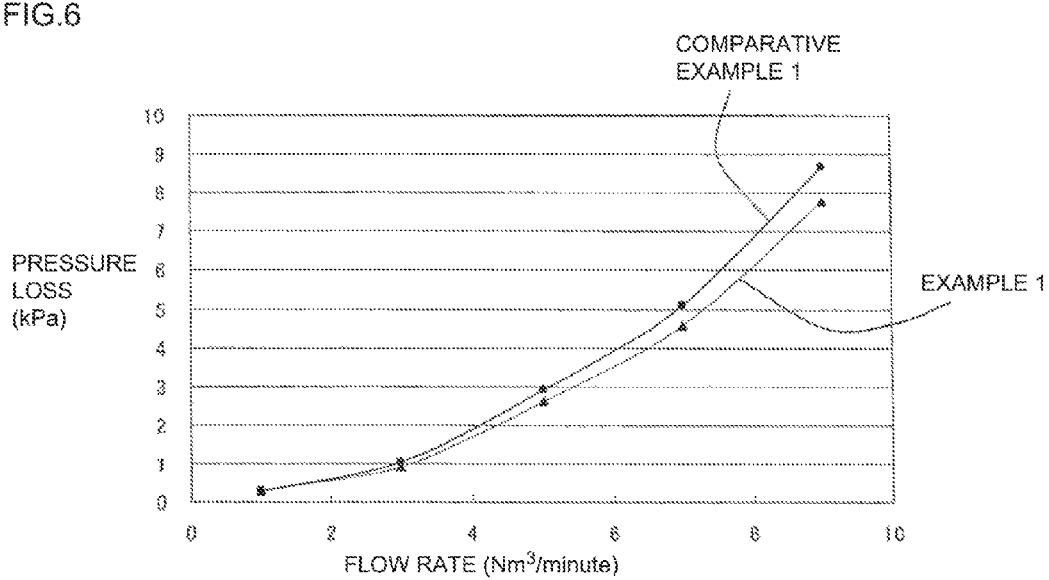
FIG. 6 is a graph showing a relation between a flow rate ($Nm^3$/minute) of an exhaust gas and a pressure loss (kPa)
Figure 7:
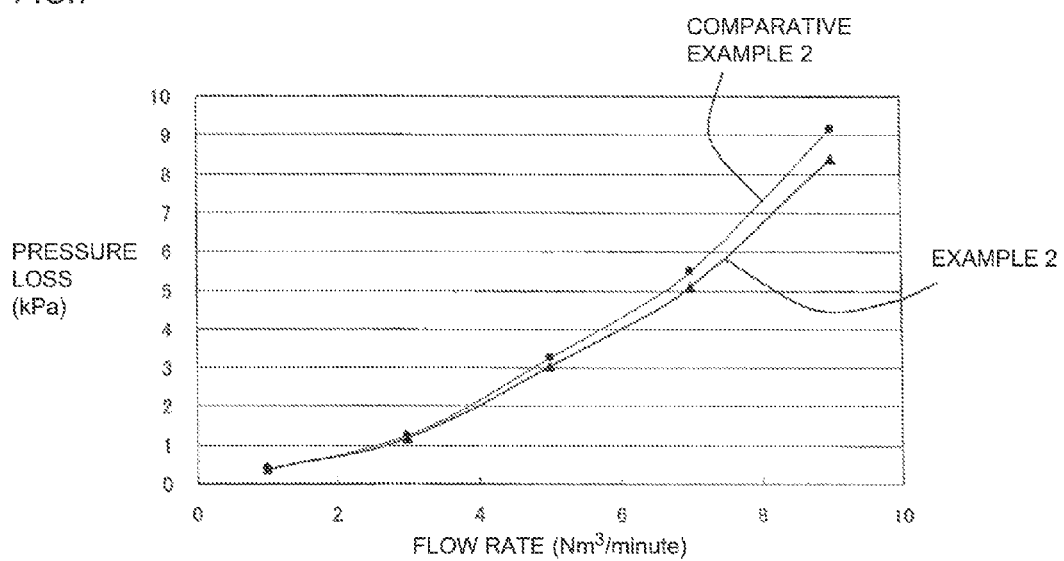
FIG. 7 is a graph showing a relation between the flow rate ($Nm^3$/minute) of the exhaust gas and the pressure loss (kPa)

In the measurement of the pressure losses, first, the prepared plugged honeycomb structure was contained in a containing can to obtain an exhaust gas purifying system. Next, the gas (the air) at 25° C. which did not include the soot was supplied to this exhaust gas purifying system at a predetermined flow rate. The pressure loss in this case was measured. The measurement result is shown in Table 2 and FIG. 6.

The measured pressure losses were evaluated by use of the following references. Specifically, the pressure loss of each of Comparative Examples 1, 2 and 5 when the flow rate of the exhaust gas was "9 Nm³/minute" was a reference (100%). In this case, when the pressure loss decreased as much as 8% or more of the pressure loss of Comparative Example 1, 2 or 5, the pressure loss was "suitable" ("A" is shown in Table 2). When the ratio of the decrease of the pressure loss to the pressure loss of Comparative Example 1, 2 or 5 was 5% or more and less than 8%, the pressure loss was "passable" ("B" is shown in Table 2). When the ratio of the decrease of the pressure loss to the pressure loss of Comparative Example 1, 2 or 5 was less than 5%, the pressure loss was "improper" ("C" is shown in Table 2). It is to be noted that Example 1 uses Comparative Example 1 as the reference, Example 2 uses Comparative Example 2 as the reference, and Examples 3 to 7 use Comparative Example 5 as the reference. The results are shown in Table 2.

Figure 8:
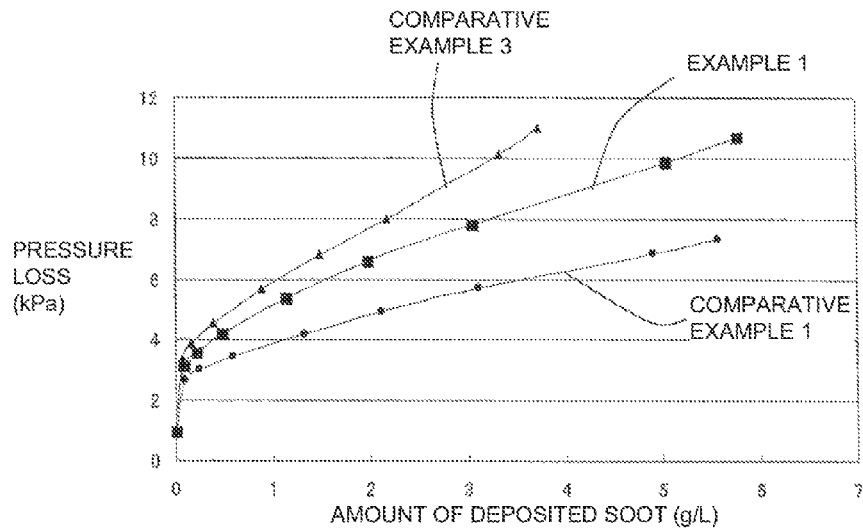
FIG. 8 is a graph showing a relation between an amount (g/L) of deposited soot and the pressure loss (kPa)
Figure 9:
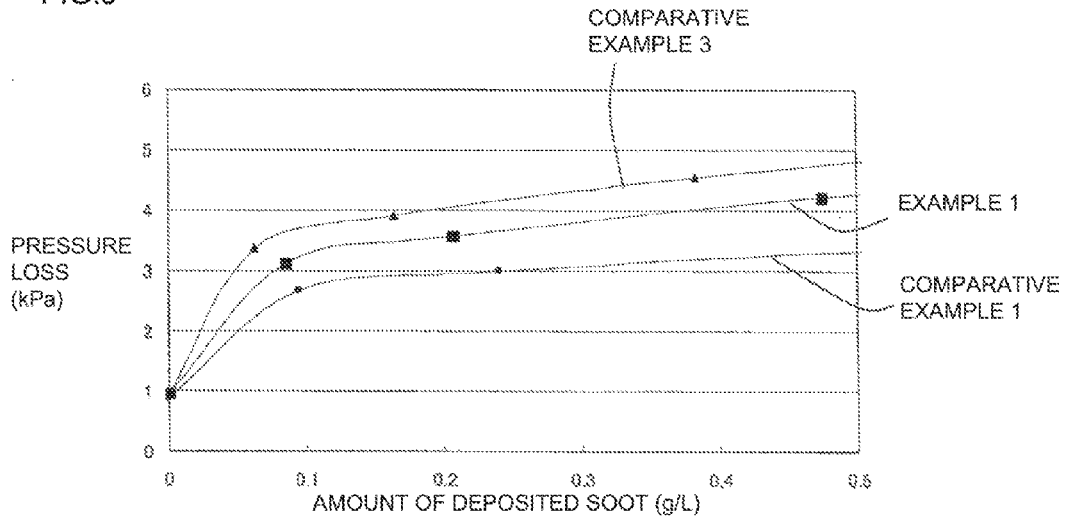
FIG. 9 is a graph showing an enlarged part of the graph shown in FIG. 8.
Figure 10:
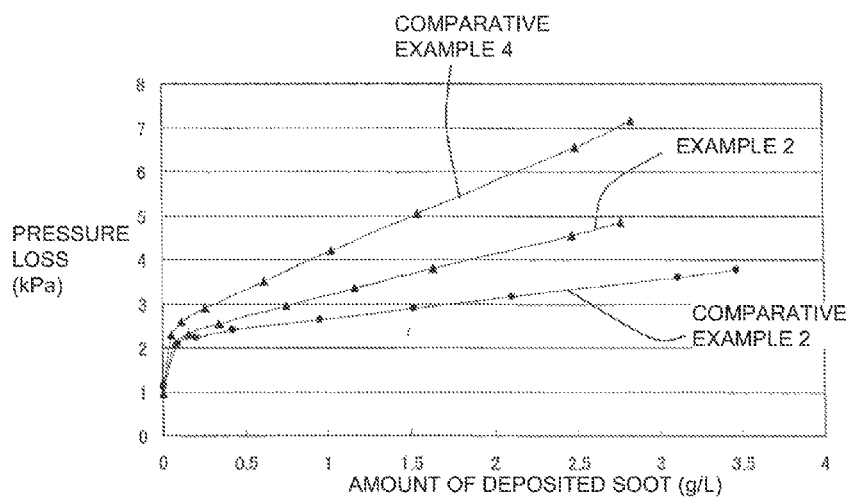
FIG. 10 is a graph showing a relation between the amount (g/L) of deposited soot and the pressure loss (kPa)
Figure 11:
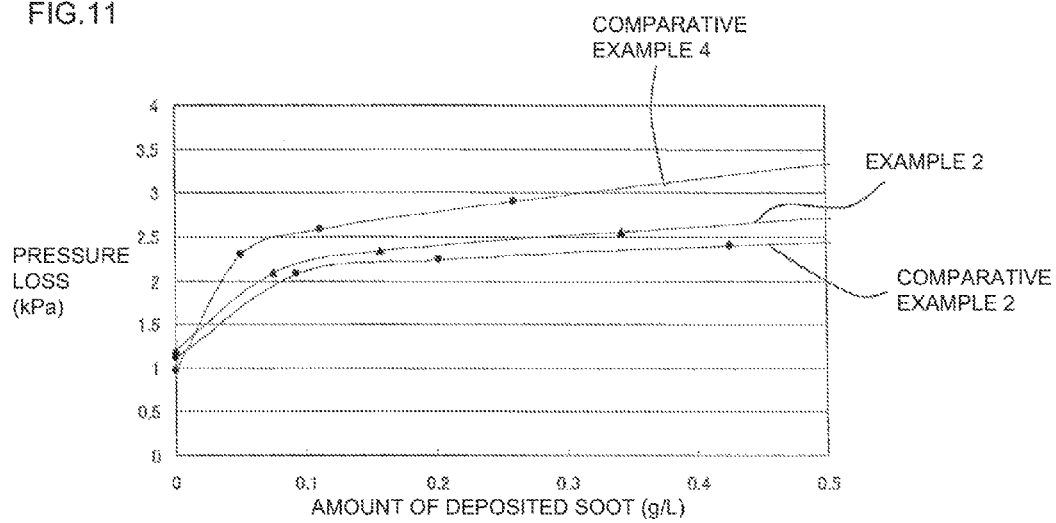
FIG. 11 is a graph showing an enlarged part of the graph shown in FIG. 10.

Next, the exhaust gas at 200° C. (the exhaust gas including the soot) was passed through the above exhaust gas purifying system at a flow rate of 1.5 m³/minute by use of a soot generator. The pressure loss in this case was measured. The measurement results are shown in Table 3, FIG. 8 and FIG. 9.

The measured pressure losses were evaluated by use of the following references. Specifically, as to the pressure loss when an amount of deposited soot was 0.20 g/L, the pressure loss of each of Comparative Examples 1, 2 and 5 was a reference (100%). In this case, when an increase ratio of the pressure loss on the basis of the pressure loss of Comparative Example 1, 2 or 5 was 15% or less, the pressure loss was "suitable" ("A" is shown in Table 4). When the increase ratio of the pressure loss on the basis of the pressure loss of Comparative Example 1, 2 or 5 was in excess of 15% and 20% or less, the pressure loss was "passable" ("B" is shown in Table 4). When the increase ratio of the pressure loss on the basis of the pressure loss of Comparative Example 1, 2 or 5 was in excess of 20%, the pressure loss was "improper" ("C" is shown in Table 4). It is to be noted that Example 1 uses Comparative Example 1 as the reference, Example 2 uses Comparative Example 2 as the reference, and Examples 3 to 7 use Comparative Example 5 as the reference. The results are shown in Table 4.

[Initial Pressure Loss to Amount of Deposited Ash]:

An initial pressure loss to an amount of collected ash was measured by use of a plugged honeycomb structure A in which octagonal cells (inflow cells) and quadrangular cells (outflow cells) were alternately arranged via partition walls (large cells and small cells were alternately formed) in a cross section perpendicular to a cell extending direction. Moreover, the initial pressure loss to the amount of the collected ash was measured by use of a plugged honeycomb structure B (a usual plugged honeycomb structure) in which quadrangular cells (inflow cells) and quadrangular cells (outflow cells) were alternately formed via partition walls in a cross section perpendicular to a cell extending direction. In each of the plugged honeycomb structures A and B, a length in the cell extending direction was 114.3 mm, and a diameter was 143.8 mm.

Figure 12:
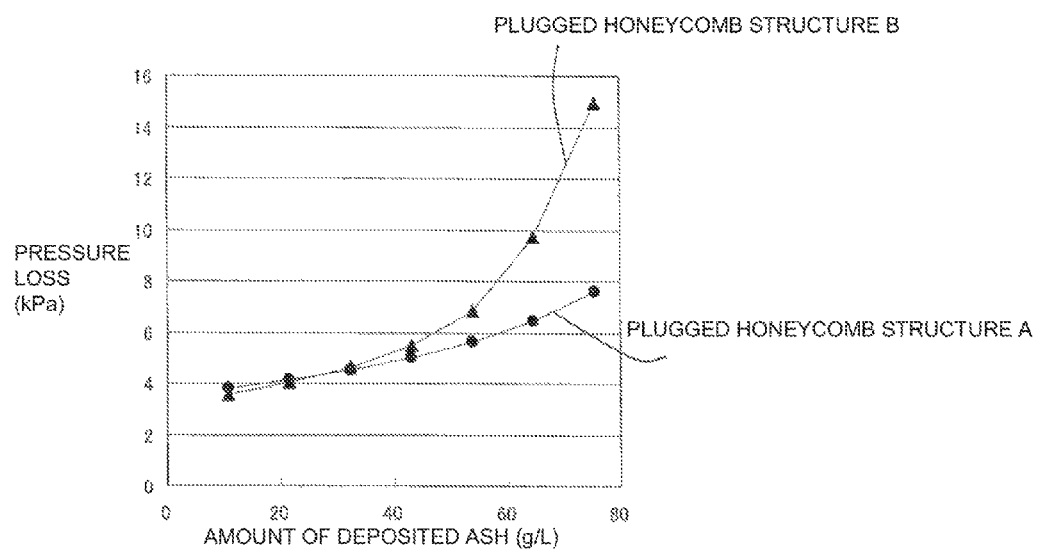
FIG. 12 is a graph showing the pressure loss (kPa) to an amount (g/L) of deposited ash.

Specifically, a flow rate of the exhaust gas which did not include the soot was 5 Nm³/minute, a temperature was 200° C., and this exhaust gas was supplied to each of the plugged honeycomb structures A and B. FIG. 12 shows the pressure loss (kPa) to an amount (g/L) of deposited ash in each of the plugged honeycomb structures A and B.

As apparent from FIG. 12, it is seen that the plugged honeycomb structure A has a lower pressure loss (kPa) to the amount (g/L) of the deposited ash, and a larger ash collecting capacity as compared with the plugged honeycomb structure B. Therefore, it is seen that in the plugged honeycomb structure of the present invention including the honeycomb structure section constituted of the large and small cells having different open areas, it is possible to collect ash and particulate matter (PM) in large amounts, as compared with a usual plugged honeycomb structure.

Example 2

The procedures of Example 1 were repeated to prepare plugged honeycomb segments. In the plugged honeycomb segments, a partition wall thickness was 0.38 mm, a large cell width was 1.99 mm, and a small cell width was 1.27 mm.

Moreover, in the plugged honeycomb segments, one side of an end surface had a length of 36.8 mm, and a length in a cell extending direction was 150.5 mm. The plugged honeycomb segments had a partition wall porosity of 42%. An average pore diameter of the partition walls was 14 μm. A cell density was 24.8 cells/cm².

Next, these plugged honeycomb segments were joined by a joining material in a state where the segments were arranged adjacent to each other so that side surfaces of the segments faced each other in the same manner as in Example 1. Then, a plugged honeycomb structure constituted of the plugged honeycomb segments of four vertical segments×four horizontal segments was obtained.

In the obtained plugged honeycomb structure, a length in the cell extending direction was 150.5 mm, and a diameter was 143.8 mm. "A ratio of the number of large cells provided with inflow side plugged portions to the number of all outflow cells" was 66%. Moreover, "a ratio of the number of "the large cells provided with the inflow side plugged portions" positioned in an outer peripheral portion of a honeycomb structure section to the number of all the large cells positioned in the outer peripheral portion of the honeycomb structure section" was 79%. The results are shown in Table 1.

As to this plugged honeycomb structure, the above [measurement of a pressure loss (kPa)] was performed. The results are shown in Table 2 to Table 4 and FIG. 6 to FIG. 11.

Examples 3 to 7

The procedures of Example 1 were repeated to prepare plugged honeycomb segments. In the plugged honeycomb segments, a partition wall thickness was 0.38 mm, a large cell width was 1.99 mm, and a small cell width was 1.27 mm.

Moreover, in the plugged honeycomb segments, one side of an end surface had a length of 36.8 mm, and a length in a cell extending direction was 150.5 mm. Furthermore, the plugged honeycomb segments had a partition wall porosity of 42%. An average pore diameter of partition walls was 14 μm. A cell density was 24.8 cells/cm².

Next, these plugged honeycomb segments were joined by a joining material in a state where the segments were arranged adjacent to each other so that side surfaces of the segments faced each other in the same manner as in Example 1. Moreover, there were obtained plugged honeycomb structures each constituted of the plugged honeycomb segments of four vertical segments×four horizontal segments.

In the obtained plugged honeycomb structures, a length in the cell extending direction was 150.5 mm, and a diameter was 143.8 mm. "A ratio of the number of large cells provided with inflow side plugged portions to the number of all outflow cells" was in a range of 25 to 90% (shown as "a ratio (%) of plugged large cells" in Table 1). Moreover, "a ratio of the number of "the large cells provided with the inflow side plugged portions" positioned in an outer peripheral portion of a honeycomb structure section to the number of all the large cells positioned in the outer peripheral portion of the honeycomb structure section" was in a range of 30 to 100% (shown as "a ratio (%) of plugged large cells of the outer peripheral portion" in Table 1). The results are shown in Table 1.

As to these plugged honeycomb structures, the above [measurement of a pressure loss (kPa)] was performed. The results are shown in Table 2 to Table 4 and FIG. 6 to FIG. 11.

TABLE 2

|  |  | Flow rate of exhaust gas (Nm³/min.) | | | | | Evaluation of pressure loss | |
| --- | --- | --- | --- | --- | --- | --- | --- | --- |
|  |  | 1 | 3 | 5 | 7 | 9 | Ratio (%) | Evaluation result |
| Comparative Example 1 | Pressure loss (kPa) | 0.40 | 1.25 | 3.24 | 5.49 | 9.16 | — | — |
| Example 1 | Pressure loss (kPa) | 0.38 | 1.18 | 3.03 | 5.09 | 8.38 | −8.6 | A |
| Comparative Example 2 | Pressure loss (kPa) | 0.30 | 1.03 | 2.91 | 5.09 | 8.67 | — | — |
| Example 2 | Pressure loss (kPa) | 0.28 | 0.94 | 2.63 | 4.58 | 7.78 | −10.3 | A |
| Comparative Example 5 | Pressure loss (kPa) | 0.17 | 0.77 | 1.74 | 3.09 | 4.86 | — | — |
| Example 3 | Pressure loss (kPa) | 0.17 | 0.72 | 1.62 | 2.87 | 4.51 | −7.1 | B |
| Example 4 | Pressure loss (kPa) | 0.17 | 0.71 | 1.59 | 2.83 | 4.44 | −8.6 | A |
| Example 5 | Pressure loss (kPa) | 0.16 | 0.65 | 1.44 | 2.56 | 4.03 | −17.1 | A |
| Example 6 | Pressure loss (kPa) | 0.16 | 0.60 | 1.32 | 2.34 | 3.68 | −24.3 | A |
| Example 7 | Pressure loss (kPa) | 0.16 | 0.59 | 1.29 | 2.30 | 3.61 | −25.7 | A |

TABLE 3

| Comparative Example 3 | Pressure loss (kPa) | 0.97 | 2.29 | 2.58 | 2.90 | 3.52 | 4.21 | 5.04 | 6.54 | 7.17 |
| --- | --- | --- | --- | --- | --- | --- | --- | --- | --- | --- | --- |
|  | Amount of deposited soot (g/L) | 0 | 0.09 | 0.24 | 0.59 | 1.32 | 2.12 | 3.11 | 4.91 | 5.57 |
| Comparative Example 1 | Pressure loss (kPa) | 1.11 | 2.08 | 2.23 | 2.40 | 2.64 | 2.89 | 3.16 | 3.60 | 3.77 |
|  | Amount of deposited soot (g/L) | 0 | 0.06 | 0.16 | 0.38 | 0.88 | 1.48 | 2.18 | 3.32 | 3.73 |
| Example 1 | Pressure loss (kPa) | 1.20 | 2.10 | 2.33 | 2.56 | 2.96 | 3.35 | 3.79 | 4.56 | 4.85 |
|  | Amount of deposited soot (g/L) | 0 | 0.08 | 0.21 | 0.47 | 1.13 | 1.97 | 3.04 | 5.04 | 5.77 |
| Comparative Example 4 | Pressure loss (kPa) | 0.95 | 3.37 | 3.90 | 4.55 | 5.66 | 6.81 | 8.01 | 10.13 | 11.02 |
|  | Amount of deposited soot (g/L) | 0 | 0.09 | 0.20 | 0.43 | 0.95 | 1.52 | 2.11 | 3.11 | 3.47 |
| Comparative Example 2 | Pressure loss (kPa) | 0.89 | 2.67 | 3.01 | 3.43 | 4.17 | 4.93 | 5.70 | 6.85 | 7.35 |
|  | Amount of deposited soot (g/L) | 0 | 0.05 | 0.11 | 0.26 | 0.61 | 1.02 | 1.54 | 2.49 | 2.84 |
| Example 2 | Pressure loss (kPa) | 0.96 | 3.13 | 3.57 | 4.21 | 5.37 | 6.59 | 7.83 | 9.86 | 10.71 |
|  | Amount of deposited soot (g/L) | 0 | 0.08 | 0.16 | 0.34 | 0.75 | 1.17 | 1.63 | 2.47 | 2.76 |
| Comparative Example 5 | Pressure loss (kPa) | 0.55 | 1.52 | 2.39 | 3.59 | 4.23 | 5.20 | 6.11 | 6.97 | 7.78 |
|  | Amount of deposited soot (g/L) | 0 | 0.10 | 0.20 | 0.50 | 1.00 | 2.00 | 3.00 | 4.00 | 5.00 |

TABLE 3-continued

| | | | | | | | | | | |
|---|---|---|---|---|---|---|---|---|---|---|
| Example 3 | Pressure loss (kPa) | 0.53 | 1.56 | 2.50 | 3.89 | 4.68 | 5.92 | 7.13 | 8.29 | 9.54 |
| | Amount of deposited soot (g/L) | 0 | 0.10 | 0.20 | 0.50 | 1.00 | 2.00 | 3.00 | 4.00 | 5.00 |
| Example 4 | Pressure loss (kPa) | 0.53 | 1.56 | 2.52 | 3.95 | 4.77 | 6.06 | 7.33 | 8.55 | 9.89 |
| | Amount of deposited soot (g/L) | 0 | 0.10 | 0.20 | 0.50 | 1.00 | 2.00 | 3.00 | 4.00 | 5.00 |
| Example 5 | Pressure loss (kPa) | 0.51 | 1.60 | 2.64 | 4.31 | 5.31 | 6.92 | 8.55 | 10.13 | 12.00 |
| | Amount of deposited soot (g/L) | 0 | 0.10 | 0.20 | 0.50 | 1.00 | 2.00 | 3.00 | 4.00 | 5.00 |
| Example 6 | Pressure loss (kPa) | 0.49 | 1.64 | 2.75 | 4.62 | 5.78 | 7.66 | 9.61 | 11.50 | 13.83 |
| | Amount of deposited soot (g/L) | 0 | 0.10 | 0.20 | 0.50 | 1.00 | 2.00 | 3.00 | 4.00 | 5.00 |
| Example 7 | Pressure loss (kPa) | 0.49 | 1.65 | 2.77 | 4.67 | 5.85 | 7.77 | 9.77 | 11.71 | 14.12 |
| | Amount of deposited soot (g/L) | 0 | 0.10 | 0.20 | 0.50 | 1.00 | 2.00 | 3.00 | 4.00 | 5.00 |

TABLE 4

| | Pressure loss (kPa) when amount of deposited soot is 0.20 g/L | Increase ratio (%) of pressure loss | Evaluation of pressure loss |
|---|---|---|---|
| Comparative Example 1 | 2.26 | — | — |
| Example 1 | 2.33 | 2.9 | A |
| Comparative Example 2 | 3.26 | — | — |
| Example 2 | 3.71 | 14.1 | A |
| Comparative Example 5 | 2.39 | — | — |
| Example 3 | 2.50 | 4.4 | A |
| Example 4 | 2.52 | 5.3 | A |
| Example 5 | 2.64 | 10.5 | A |
| Example 6 | 2.75 | 15.0 | A |
| Example 7 | 2.77 | 15.8 | B |

In Examples 3 and 4, as compared with the plugged honeycomb structures of Examples 5 to 7, "the ratio of the number of "the large cells provided with the inflow side plugged portions"" was about ½ or less. Therefore, an increase ratio of the pressure loss at passage of an exhaust gas including the soot decreased.

Comparative Examples 1 to 5

The procedures of Example 1 were repeated to prepare plugged honeycomb structures except that conditions shown in Table 1 were satisfied. As to these plugged honeycomb structures, the above [measurement of a pressure loss (kPa)] was performed. The results are shown in Tables 2 and 3 and FIG. 6 to FIG. 11.

As apparent from Table 2, Table 3 and FIG. 6 to FIG. 11, it has been found that in the plugged honeycomb structures of Examples 1 to 7, an increase of the pressure loss at supply of a gas which does not include ash or soot is suppressed as compared with the plugged honeycomb structures of Comparative Examples 1 to 5. That is, it has been seen that the plugged honeycomb structures of Examples 1 to 7 are excellent purifying filters of an exhaust gas containing a less amount of ash and PM such as the soot. Moreover, it has been seen that when the exhaust gas including the ash and soot is supplied, an increase of an initial pressure loss is especially suppressed (see FIG. 11). Moreover, the plugged honeycomb structures of Examples 1 to 7 are provided with the cells having large open areas, and hence it is possible to collect the ash and PM in large amounts.

A plugged honeycomb structure of the present invention can suitably be used for purification of an exhaust gas including ash and particulate matter.

DESCRIPTION OF SIGNS

4: cell, 4a: large cell, 4b: small cell, 5: partition wall, 7: outer peripheral wall, 8a: inflow side plugged portion, 11: honeycomb structure section, 11a: inflow side end surface, 11b: outflow side end surface, 21: outer peripheral honeycomb segment, 22: central honeycomb segment, 24: joining material, f: bold line, P: partial region, and 100, 101, 102 and 103: plugged honeycomb structure.

What is claimed is:

1. A plugged honeycomb structure comprising:
a honeycomb structure section having porous partition walls with which a plurality of cells extending from an inflow side end surface to an outflow side end surface are formed to become through channels of a fluid, the plurality of cells including large cells and small cells having different open areas in a cross section perpendicular to an extending direction of the cells;
inflow side plugged portions arranged in inflow side end portions of the predetermined cells including the large cells and the small cells among the plurality of cells; and
outflow side plugged portions arranged in outflow side end portions of remaining cells including the large cells and the small cells among the plurality of cells,
wherein the predetermined cells are outflow cells having plugged inflow side end portions and open outflow side end portions, and the remaining cells are inflow cells having plugged outflow side end portions and open inflow side end portions, and
the large cells provided with the inflow side plugged portions and the small cells provided with the outflow side plugged portions are formed in an outer peripheral portion of the honeycomb structure section, and are not formed in a portion other than the outer peripheral portion.

2. The plugged honeycomb structure according to claim 1, wherein a ratio of a number of the large cells provided with the inflow side plugged portions to the number of all the outflow cells is from 30 to 85%.

3. The plugged honeycomb structure according to claim 1, wherein a ratio of a number of all the large cells positioned in an outer peripheral portion of the honeycomb structure section and provided with the inflow side plugged portions to the number of all the large cells positioned in the outer peripheral portion of the honeycomb structure section is from 36 to 100%.

4. The plugged honeycomb structure according to claim 2, wherein a ratio of a number of all the large cells positioned in an outer peripheral portion of the honeycomb structure section and provided with the inflow side plugged portions to the number of all the large cells positioned in the outer peripheral portion of the honeycomb structure section is from 36 to 100%.

5. The plugged honeycomb structure according to claim 1, wherein the honeycomb structure section is constituted of outer peripheral honeycomb segments constituting an outer periphery of the honeycomb structure section, and central honeycomb segments positioned on inner sides of the outer peripheral honeycomb segments.

6. The plugged honeycomb structure according to claim 2, wherein the honeycomb structure section is constituted of outer peripheral honeycomb segments constituting an outer periphery of the honeycomb structure section, and central honeycomb segments positioned on inner sides of the outer peripheral honeycomb segments.

7. The plugged honeycomb structure according to claim 3, wherein the honeycomb structure section is constituted of outer peripheral honeycomb segments constituting an outer periphery of the honeycomb structure section, and central honeycomb segments positioned on inner sides of the outer peripheral honeycomb segments.

8. The plugged honeycomb structure according to claim 4, wherein the honeycomb structure section is constituted of outer peripheral honeycomb segments constituting an outer periphery of the honeycomb structure section, and central honeycomb segments positioned on inner sides of the outer peripheral honeycomb segments.

* * * * *